(12) United States Patent
Yoshikawa et al.

(10) Patent No.: US 8,141,215 B2
(45) Date of Patent: Mar. 27, 2012

(54) APPARATUS FOR ARRANGING FIBER BUNDLES

(75) Inventors: Genki Yoshikawa, Kariya (JP); Junji Takeuchi, Kariya (JP); Yoshiharu Yasui, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 499 days.

(21) Appl. No.: 12/377,333

(22) PCT Filed: Apr. 16, 2008

(86) PCT No.: PCT/JP2008/057395
§ 371 (c)(1),
(2), (4) Date: Feb. 12, 2009

(87) PCT Pub. No.: WO2008/139821
PCT Pub. Date: Nov. 20, 2008

(65) Prior Publication Data
US 2010/0218902 A1    Sep. 2, 2010

(30) Foreign Application Priority Data
May 15, 2007  (JP) .................................. 2007-129605

(51) Int. Cl.
D04H 3/04 (2006.01)
(52) U.S. Cl. .......................................... 28/102; 28/100
(58) Field of Classification Search .................. 28/100, 28/101, 102, 140, 172.1, 208; 156/441, 180, 156/181, 440; 19/299
See application file for complete search history.

(56) References Cited

U.S. PATENT DOCUMENTS

| | | | | |
|---|---|---|---|---|
| 4,095,619 A | * | 6/1978 | Kallmeyer | 139/22 |
| 4,163,305 A | * | 8/1979 | Semjonow et al. | 19/299 |
| 4,368,124 A | * | 1/1983 | Brumfield | 210/321.79 |
| 4,467,506 A | * | 8/1984 | Osborn | 28/102 |
| 4,557,790 A | * | 12/1985 | Wisbey | 156/511 |
| 4,916,997 A | * | 4/1990 | Spain | 87/1 |

(Continued)

FOREIGN PATENT DOCUMENTS

JP    61-003732 A    1/1986
(Continued)

OTHER PUBLICATIONS

International Preliminary Report on Patentability for corresponding PCT Application No. PCT/JP2008/057395.
International Search Report for PCT/JP2008/057395, mailed May 13, 2008.

*Primary Examiner* — Amy Vanatta
(74) *Attorney, Agent, or Firm* — Locke Lord LLP

(57) ABSTRACT

A connection pipe 40A is fit in an introduction pipe 34A. A guide groove 342 extends on the side of the introduction pipe 34A in the Z-axis direction. A guide screw 41 is screwed on the peripheral face of the connection pipe 40A to penetrate through a peripheral wall of the connection pipe 40A. A distal end of the guide screw 41 enters the guide groove 342. The distal end of the guide screw 41 is movable in the Z-axis direction in the guide groove 342. The connection pipe 40A is movable relative to the introduction pipe 34A in the Z-axis direction within the range of the length of the guide groove 342. The connection pipe 40A and the guide pipes 31A are moved in the Z-axis direction with an air cylinder 43. Accordingly, when fiber bundles are arranged using a plurality of guide pipes, the guide pipe is prevented from being caught by a fiber bundle drawn out of another guide pipe.

8 Claims, 11 Drawing Sheets

U.S. PATENT DOCUMENTS

| | | | |
|---|---|---|---|
| 5,047,109 A * | 9/1991 | Krueger | 156/440 |
| 5,667,613 A * | 9/1997 | Fantino et al. | 156/182 |
| 5,702,601 A * | 12/1997 | Bikson et al. | 210/321.79 |
| 5,772,821 A * | 6/1998 | Yasui et al. | 156/93 |
| 6,267,149 B1 * | 7/2001 | Yasui et al. | 139/11 |
| 2003/0140467 A1 | 7/2003 | Cahuzac et al. | 28/103 |
| 2009/0126875 A1 * | 5/2009 | Uozumi et al. | 156/425 |

FOREIGN PATENT DOCUMENTS

| | | |
|---|---|---|
| JP | 61-220825 | 10/1986 |
| JP | 06-184906 A | 7/1994 |
| JP | 2000-199151 | 7/2000 |
| JP | 2003-239159 | 8/2003 |
| JP | 2007-016347 | 1/2007 |

* cited by examiner

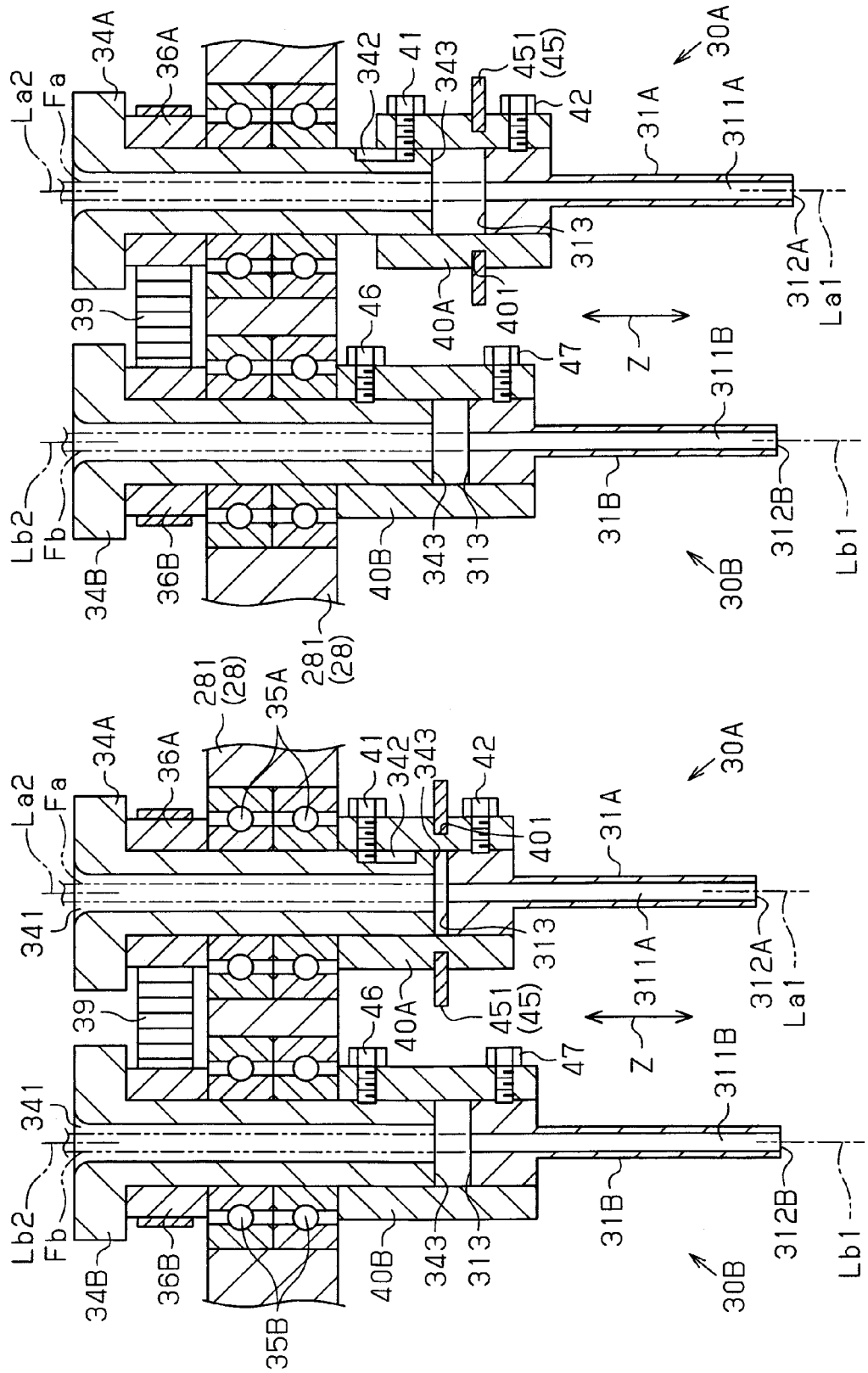

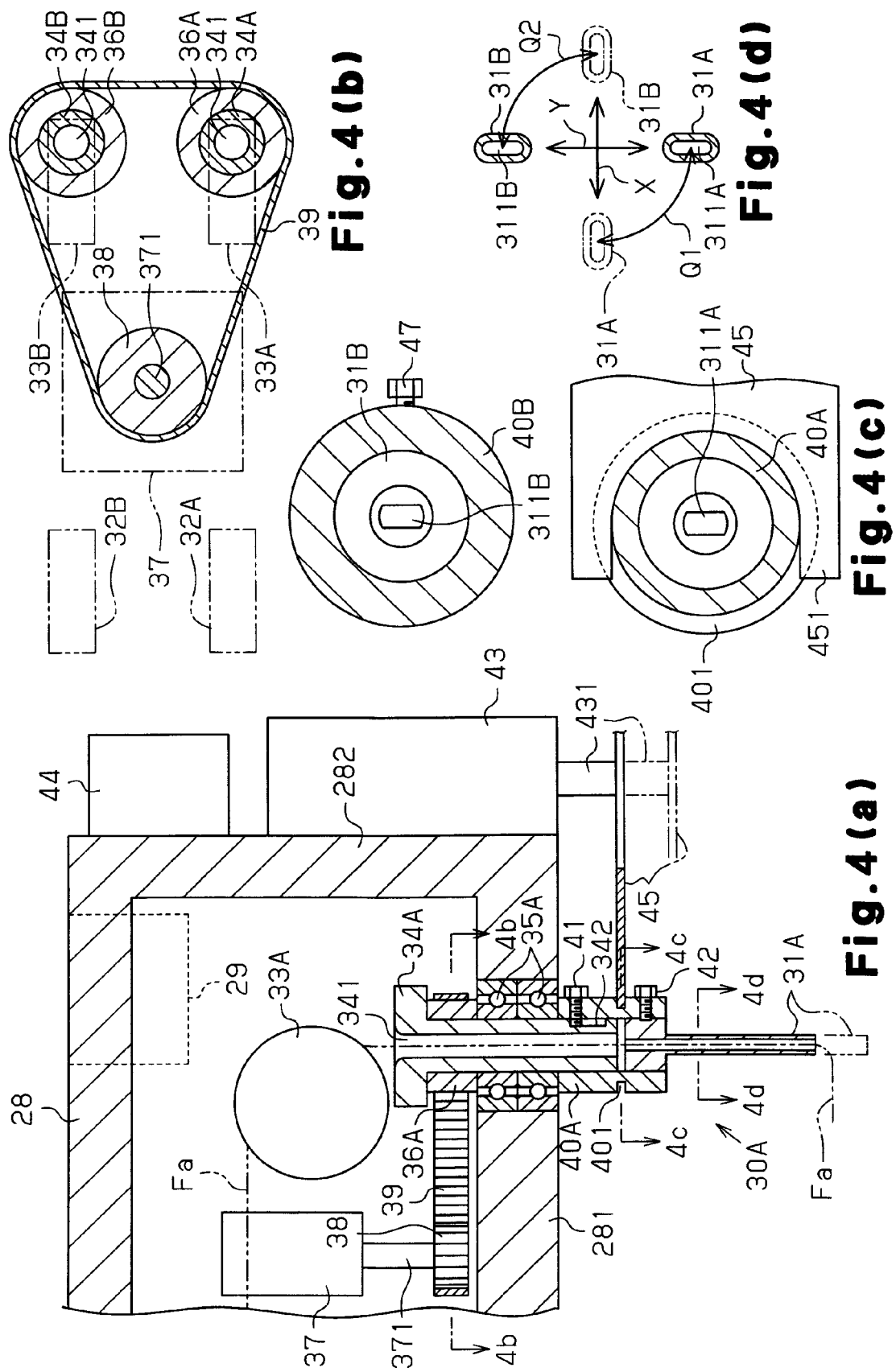

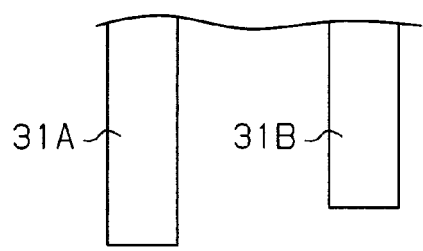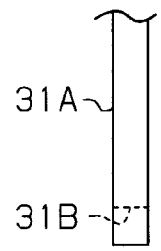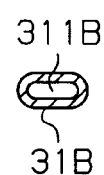
Fig.15(a)    Fig.15(b)    Fig.15(c)
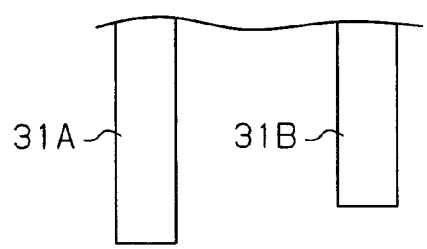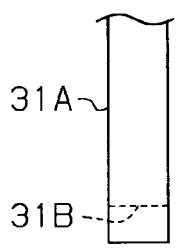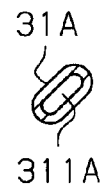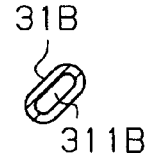
Fig.16(a)    Fig.16(b)    Fig.16(c)
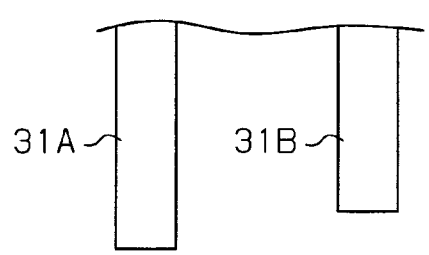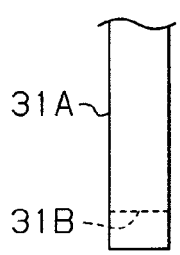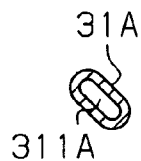
Fig.17(a)    Fig.17(b)    Fig.17(c)

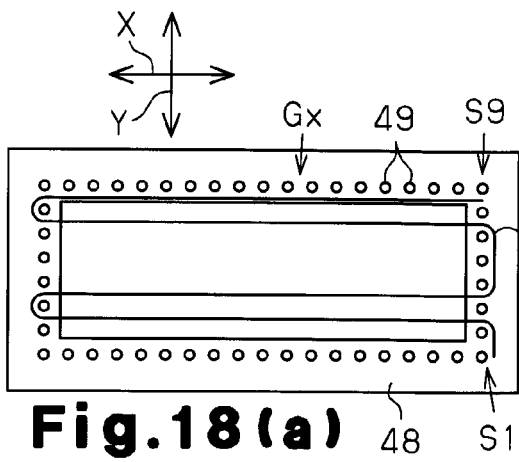
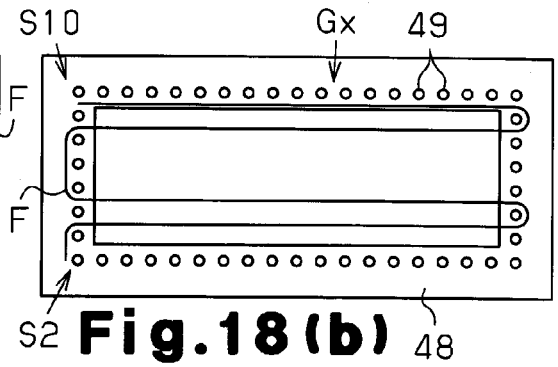
Fig.18(a)   Fig.18(b)
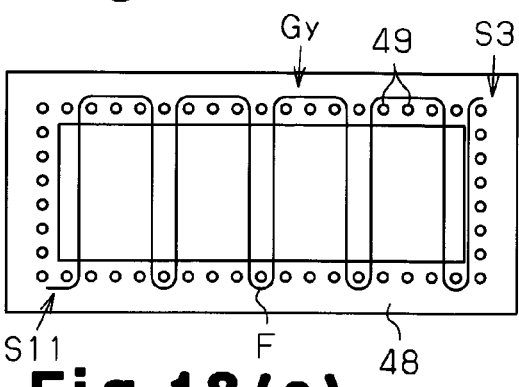
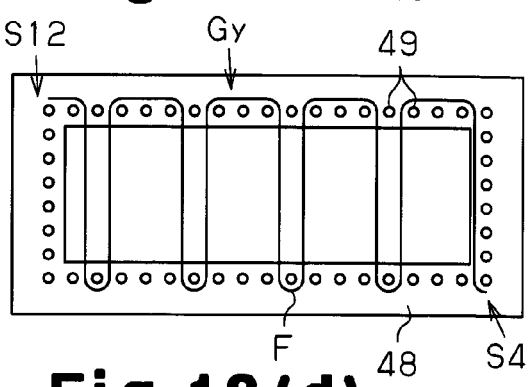
Fig.18(c)   Fig.18(d)
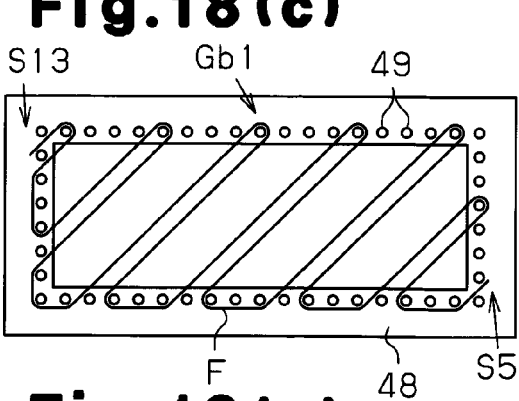
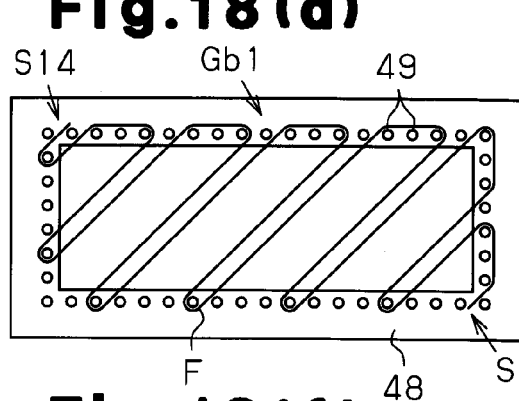
Fig.18(e)   Fig.18(f)
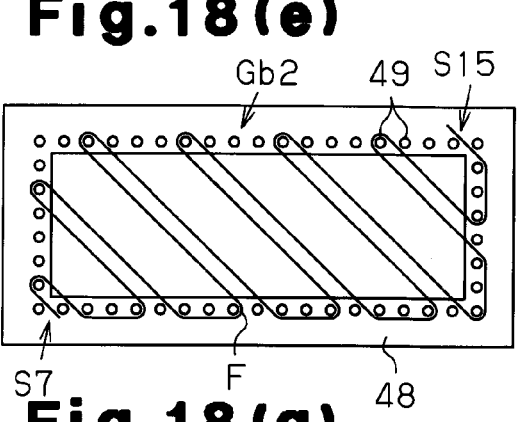
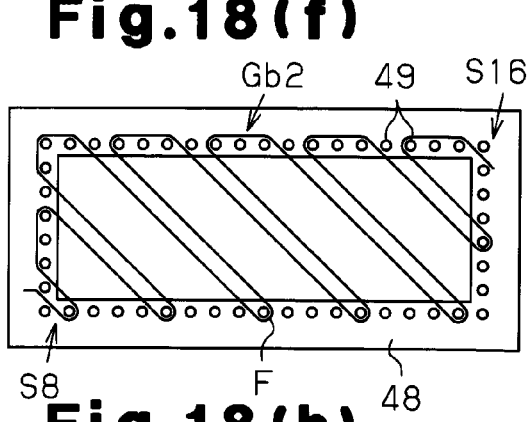
Fig.18(g)   Fig.18(h)

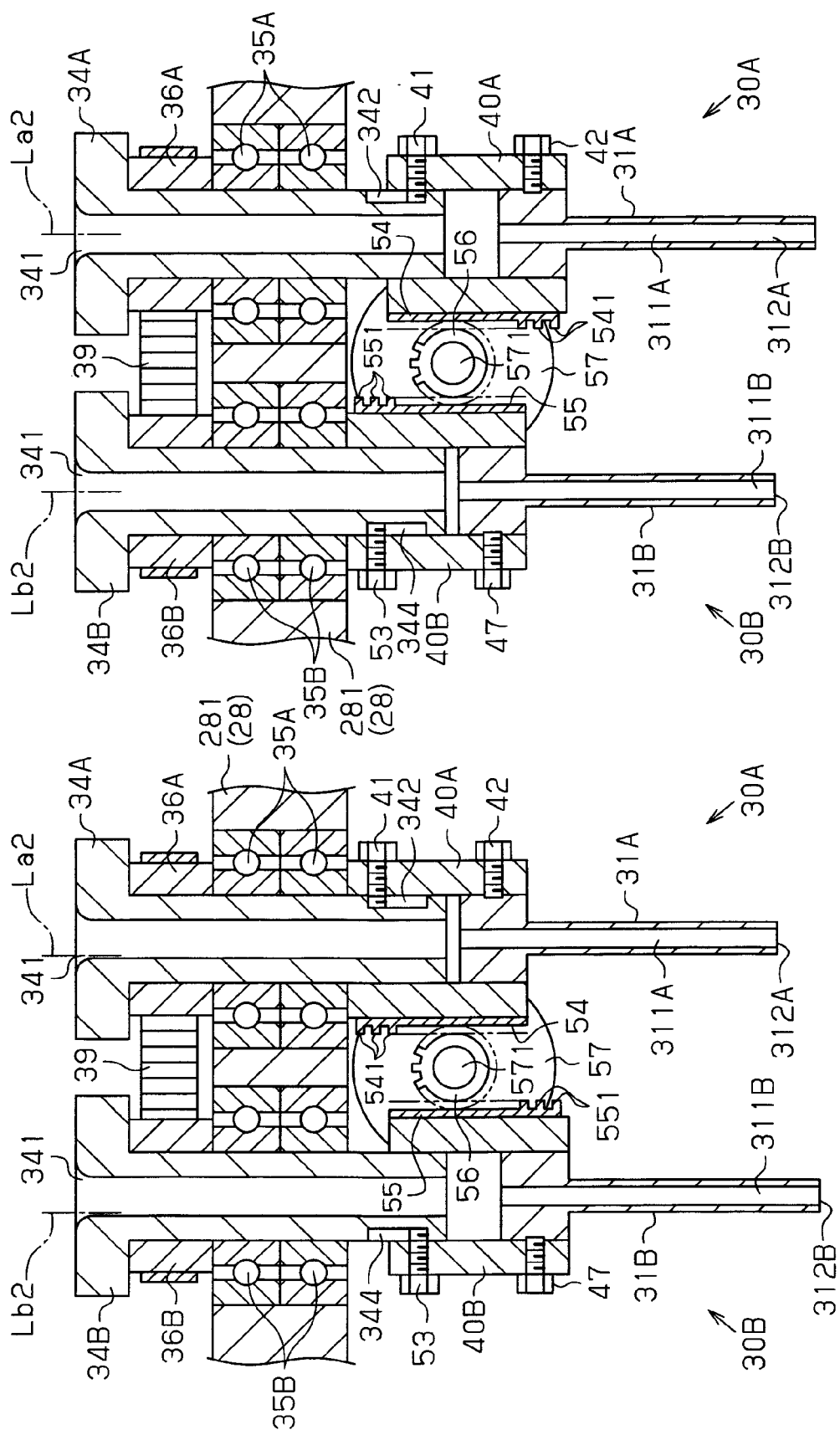

APPARATUS FOR ARRANGING FIBER BUNDLES

FIELD OF THE INVENTION

The present invention relates to an apparatus for arranging fiber bundles including a plurality of guide pipes and a transfer device for transferring the guide pipes, each of the guide pipes having a guide hole through which a fiber bundle is passed, wherein the transfer device transfers the guide pipes so that the fiber bundles are extracted and arranged from guide hole outlets of the guide pipes.

BACKGROUND OF THE INVENTION

Conventionally, as a fiber reinforced composite material widely used for a light-weight structural material, three-dimensional fabric material (three-dimensional fiber structure) exists for use as a reinforcing material. This fiber reinforced composite material has very high strength and is used for forming part of the structural material for aircraft and the like. Methods for forming the three-dimensional fiber structure for use as a reinforcing material in fiber reinforced composite material includes a method comprising laminating a plurality of layers of fiber bundles in which the fiber bundles are arranged in a folded state to form the layers of the fiber bundles having at least two biaxial orientations and connecting the layers of the fiber bundles with threads extending in a thickness direction, which is a direction perpendicular to each of the layer of the fiber bundles. Patent Documents 1 and 2 disclose apparatus for arranging one or more fiber bundles in which one or more fiber bundles are drawn out of one or more guide pipes that are transferred along their plane of arrangement and the one or more fiber bundles are arranged among pins spaced at a predetermined pitch in a flat state so that flat faces of the folded fiber bundles are arranged along the arrangement plane to form a layer of the fiber bundles.

Patent Document 1 discloses an embodiment in which a plurality of guide pipes are used to arrange a plurality of fiber bundles simultaneously. In the configuration where a plurality of fiber bundles are arranged simultaneously, the time for forming a layer of the fiber bundles is significantly reduced compared with the case where one fiber bundle is arranged at one time.

However, when a direction in which the plurality of guide pipes moves is turned to wind the fiber bundles around pins, it is possible for a guide pipe to be interfered with or caught by the fiber bundle drawn out of another guide pipe. This may cause bending or breakage of the guide pipes.

Patent Document 1: Japanese Laid-Open Patent Publication 2000-199151

Patent Document 2: Japanese Laid-Open Patent Publication 2007-16347

SUMMARY OF THE INVENTION

An object of the present invention is to prevent a guide pipe from being caught by a fiber bundle drawn out of another guide pipe when a plurality of guide pipes is used to arrange fiber bundles.

To achieve the above object, according to an embodiment of the invention, an apparatus for arranging fiber bundles including a plurality of juxtaposed guide pipes and a transfer device for transferring the guide pipes is provided. Each of the guide pipes has a guide hole through which a fiber bundle is passed. The transfer device transfers the guide pipes so that the fiber bundles are extracted from outlets of the guide holes of the guide pipes and arranged to form a layer of the fiber bundles. The apparatus comprises a position-changing device to which the plurality of guide pipes except for one pipe or all the plurality of guide pipes are connected. The position-changing device is capable of changing the position of the guide pipe connected to the position-changing device in the direction in which the fiber bundle layer is laminated. The position-changing device is switched between a first order-defining state and a second order-defining state. In the first order-defining state, outlets of the guide holes of the guide pipes are positioned in a first lamination direction in the order from the guide pipe located at a first end to the guide pipe located at a second end. In the second order-defining state, outlets of the guide holes of the guide pipes are positioned in a second lamination direction in the order from the guide pipe located at a first end to the guide pipe located at a second end. The second direction is opposite from the first direction.

BRIEF DESCRIPTION OF THE DRAWINGS

FIGS. 3(a) and (b) are enlarged cross-sections of arrangement heads;

FIG. 4(a) is a partial enlarged cross-sectional view illustrating a support frame and an area near the portion where the arrangement heads are attached, FIG. 4(b) is a cross-sectional view taken along the line 4b-4b of FIG. 4(a), FIG. 4(c) is a cross-sectional view taken along the line 4c-4c of FIG. 4(a), and FIG. 4(d) is a cross-sectional view taken along the line 4d-4d of FIG. 4(a);

FIG. 15(a) is a side view illustrating a juxtaposed state of the guide pipes, FIG. 15(b) is a rear view illustrating an order of the guide pipes, and FIG. 15(c) is across-sectional plan view illustrating the orientation of the guide pipes;

FIG. 16(a) is a side view illustrating a juxtaposed state of the guide pipes, FIG. 16(b) is a rear view illustrating an order of the guide pipes, and FIG. 16(c) is a cross-sectional plan view illustrating the orientation of the guide pipes;

FIG. 17(a) is a side view illustrating a juxtaposed state of the guide pipes, FIG. 17(b) is a rear view illustrating an order of the guide pipes, and FIG. 17(c) is a cross-sectional plan view illustrating the orientation of the guide pipes;

FIGS. 18(a)-(h) are schematic plan views illustrating arrangement patterns of the fiber bundles F; and FIGS. 19(a) and (b) are partial enlarged cross-sections of arrangement heads according to a second embodiment.

DETAILED DESCRIPTION OF THE PREFERRED EMBODIMENTS

Figure 1:
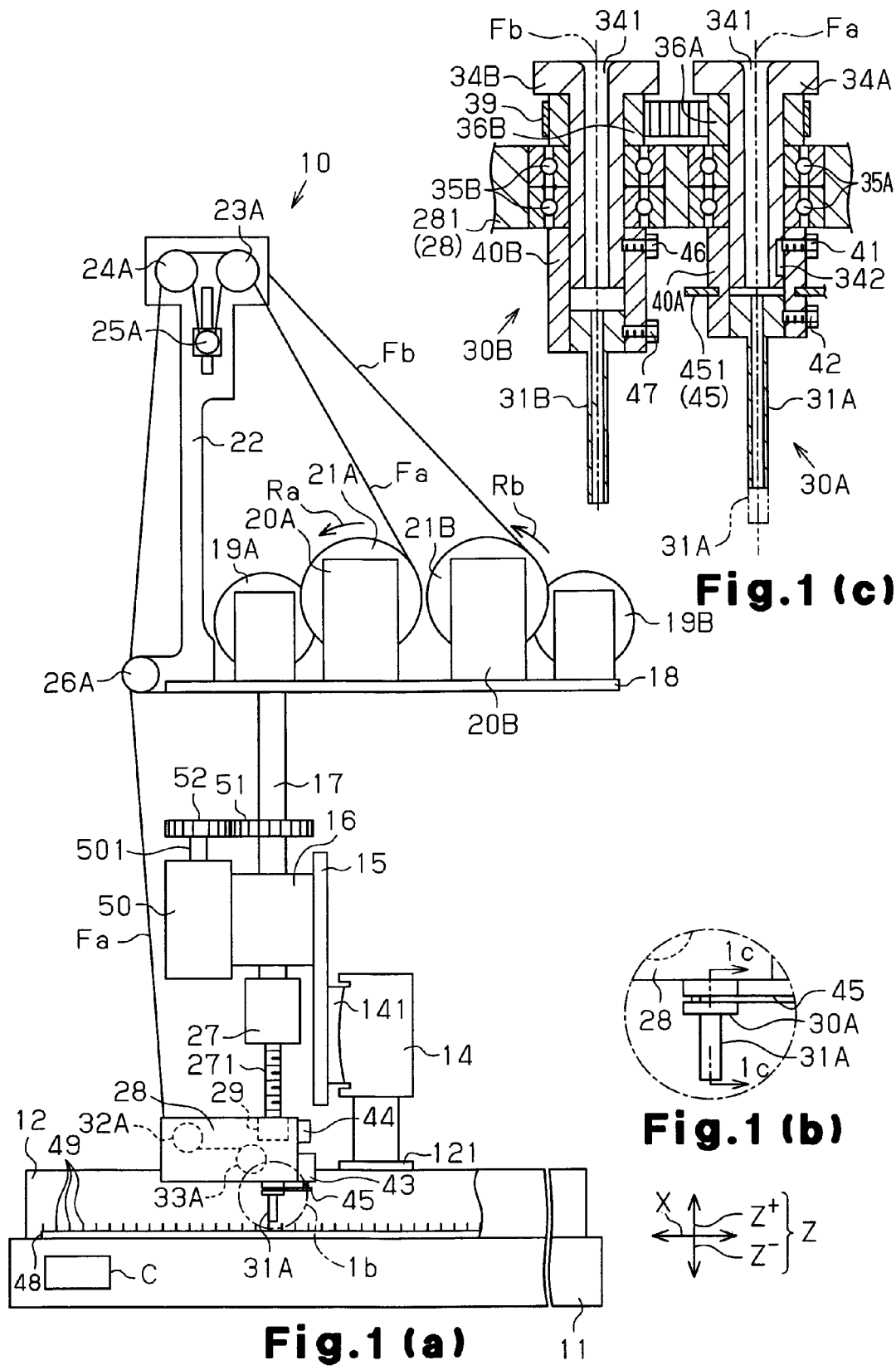
FIG. 1(a) is a side view of an apparatus for arranging fiber bundles according to a first embodiment of the present invention.
FIG. 1(b) is an enlarged view of the encircled portion 1b of FIG. 1(a)
FIG. 1(c) is a cross-sectional view taken along the line 1c-1c of FIG. 1(b)

A first embodiment of the present invention will be described with reference to FIGS. 1 to 18. FIG. 1(a) illustrates an overall view of an apparatus 10 for arranging fiber bundles according to a first embodiment.

Figure 2:
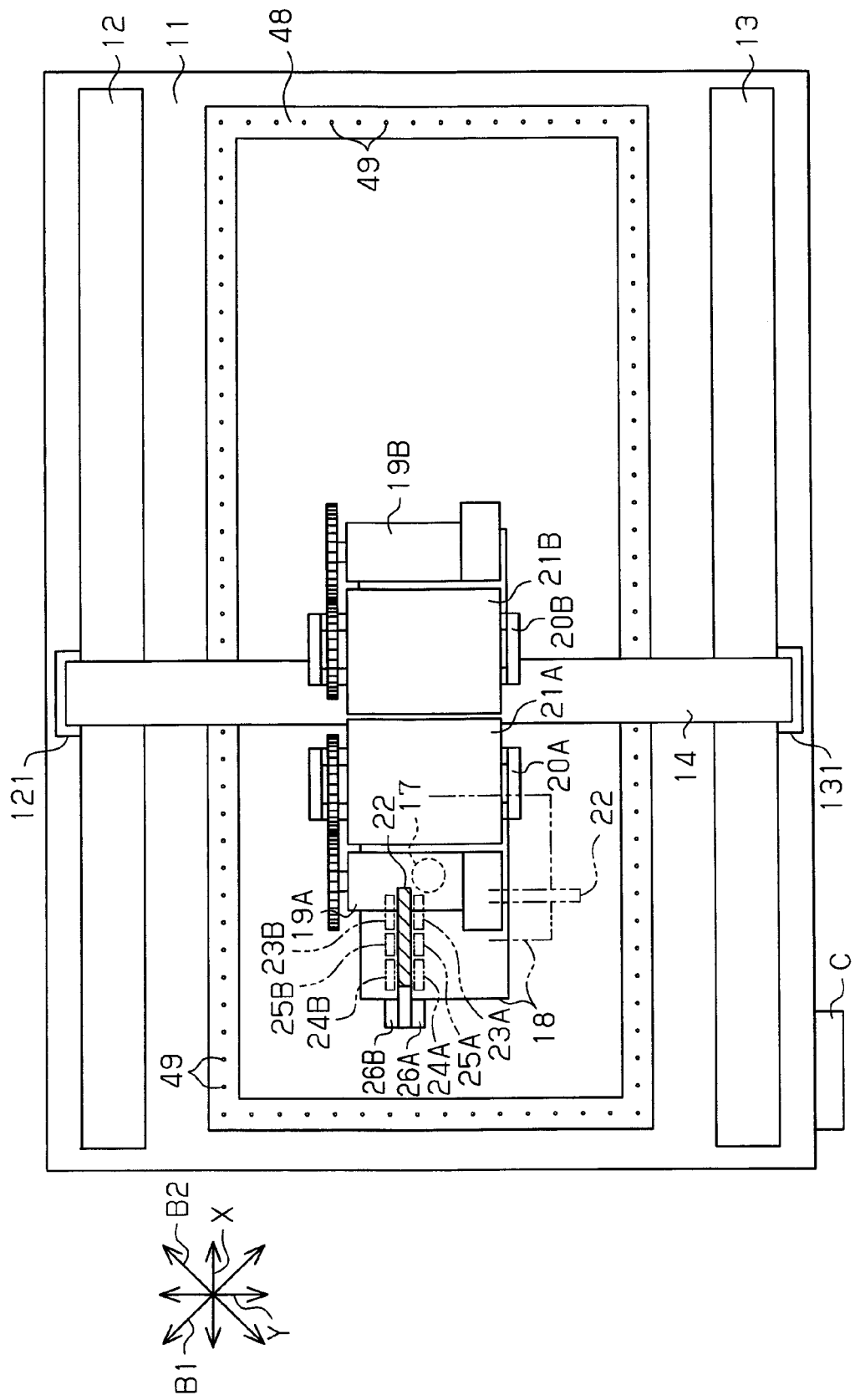
FIG. 2 is a cross-sectional plan view of the apparatus for arranging fiber bundles of FIG. 1(a)

As illustrated in FIG. 2, a pair of linear sliders 12 and 13 is provided on a rectangular base 11 extending in the longitudinal direction of the base 11 (referred to as "X-axis direction" hereinafter). The linear slider 12 includes a ball screw mechanism having a motor (not shown) and a movable element 121 that is moved in the X-axis direction by operation of the ball screw mechanism. The linear slider 13 includes a ball screw mechanism having a motor (not shown) and a movable element 131 that is moved in the X-axis direction by operation of the ball screw mechanism. In both linear sliders 12 and 13, the two ball screw mechanisms are moved in synchronization with each other and the movable element 121 and 131 are moved accordingly in the X-axis direction in synchronization with each other.

A linear slider 14 is provided over the movable elements 121 and 131 to extend in a direction perpendicular to the X-axis direction (referred to as the "Y-axis direction" hereinafter). The operation of the linear sliders 12 and 13 causes the linear slider 14 to translate in the X-axis direction. The linear slider 14 includes a ball screw mechanism having a motor (not shown) and a movable element 141 that is moved in the Y-axis direction by operation of the ball screw mechanism.

The operation of the linear sliders 12, 13 and 14 are controlled by a control computer C.

As illustrated in FIG. 1(a), a support plate 15 is fixed to the movable element 141 and a support frame 16 is fixed to the support plate 15. A spindle 17 stands on the support frame 16 and a stage 18 is fixed to the top of the spindle 17. A motor 50 is attached to the side of the support frame 16. A gear 51 is fixed around the spindle 17 and a gear 52 is fixed around an output shaft 501 of the motor 50. The gear 52 mates with the gear 51 to rotate the spindle 17 by the driving of the motor 50.

Motors 19A and 19B and bobbin holders 20A and 20B are supported on the stage 18. A bobbin 21A having a fiber bundle Fa is attached to the bobbin holder 20A. The bobbin 21A is rotated in a direction to reel out the fiber bundle Fa (in the direction indicated by arrow Ra in FIG. 1(a)) by drive force from the motor 19A. A bobbin 21B having a fiber bundle Fb is attached to the bobbin holder 20B. The bobbin 21B is rotated in a direction to reel out the fiber bundle Fb (in the direction indicated by arrow Rb in FIG. 1(a)) by drive force from the motor 19B. The fiber bundles Fa and Fb are formed of multiple bundles of untwisted single fibers (carbon fiber in this embodiment) in a flat shape. The operation of the motors 19A and 19B are controlled by the control computer C.

A flat support post 22 stands on the stage 18. Guide rollers 23A and 24A are attached to one surface of the top of the flat support post 22. A tension roller 25A is provided below the rollers 23A and 24A to be movable in a vertical direction. A guide roller 26A is attached to one surface of the bottom of the post 22. The fiber bundle Fa reeled out of the bobbin 21A is guided below the stage 18 via the guide rollers 23A and 24A, the tension roller 25A, and the guide roller 26A. A tension providing mechanism including the tension roller 25A provides the fiber bundle Fa with appropriate tension.

As illustrated in FIG. 2, guide rollers 23B and 24B are attached to another surface of the top of the flat support post 22. A tension roller 25B is provided below the guide roller 23B and 24B to be movable in a vertical direction. A guide roller 26B is attached to another surface of the bottom of the post 22. The fiber bundle Fb reeled out of the bobbin 21B is guided under the stage 18 via the guide rollers 23B and 24B, the tension roller 25B, and the guide roller 26B. A tension providing mechanism including the tension roller 25B provides the fiber bundle Fb with appropriate tension.

As illustrated in FIG. 1(a), the lower end of the spindle 17 protrudes from the support frame 16 downward and a motor 27 is fixed to the lower end. A screw shaft 271, which is an output shaft of the motor 27, extends in a Z-axis direction and a support frame 28 is connected to the screw shaft 271 via a nut 29. The screw shaft 271 is screwed in the nut 29 so that the support frame 28 translates in the Z-axis direction by drive force from the motor 27. The operation of the motor 27 is controlled by the control computer C.

As illustrated in FIGS. 1(b) and (c), arrangement head 30A and 30B are attached to a lower wall 281 of the support frame 28. The arrangement head 30A include a linear guide pipe 31A for reeling out the fiber bundle Fa. The arrangement head 30B includes a linear guide pipe 31B for reeling out the fiber bundle Fb. The guide pipes 31A and 31B are juxtaposed. As illustrated in FIG. 5(c) and FIGS. 6-17, guide holes 311A and 311B extending in the guide pipes 31A and 31B in the longitudinal direction thereof have a flat shape. The guide pipe 31A reels the fiber bundle Fa in a flat state out of an outlet 312A of the guide hole 311A. The guide pipe 31B reels the fiber bundle Fb in a flat state out of an outlet 312B of the guide hole 311B.

As illustrated in FIG. 4(b), the guide rollers 32A and 33A and the guide roller 32B and 33B are attached to the support frame 28 (see FIG. 4(a)). The fiber bundle Fa guided through the guide roller 26A is led into the guide pipe 31A via the guide rollers 32A and 33A. The fiber bundle Fb guided through the guide roller 26B is led into the guide pipe 31B via the guide rollers 32B and 33B.

As illustrated in FIGS. 3(a) and (b), an introduction pipe 34A is supported on the lower wall 281 of the support frame 28 to be rotatable via a radial bearing 35A. The introduction pipe 34A constitutes the arrangement head 30A. The introduction pipe 34A penetrates the lower wall 281 in the Z-axis direction. An introduction hole 341 in the introduction pipe 34A extends in the Z-axis direction. The upper end of the introduction pipe 34A protrudes from the lower wall 281 upwardly and a timing pulley 36A is fixed to the upper end of the introduction pipe 34A.

An introduction pipe 34B is supported on the lower wall 281 to be rotatable via a radial bearing 35B. The introduction pipe 34B constitutes the arrangement head 30B. The introduction pipe 34B penetrates the lower wall 281 in the Z-axis direction. An introduction hole 341 in the introduction pipe 34B extends in the Z-axis direction. The upper end of the introduction pipe 34B protrudes from the lower wall 281 upwardly and a timing pulley 36B is fixed to the upper end of the introduction pipe 34B.

As illustrated in FIG. 4(a), a motor 37 is attached to the support frame 28. A timing pulley 38 is fixed to an output shaft 371 of the motor 37. As illustrated in FIG. 4(b), the timing pulley 38 and the timing pulleys 36A, 36B are wound with a timing belt 39. The driving of the motor 37 causes the introduction pipes 34A and 34B to rotate in the same direction. The motor 37, the timing pulleys 36A, 36B and 38, and the timing belt 39 constitute a rotation drive mechanism for rotating the introduction pipes 34A and 34B.

As illustrated in FIGS. 3(a) and (b), a connection pipe 40A is fit over the lower end of the introduction pipe 34A that protrudes below the lower wall 281. A guide groove 342 extends on the lateral side of the introduction pipe 34A in the Z-axis direction. A guide screw 41 is screwed through the circumferential wall of the connection pipe 40A. A distal end of the guide screw 41 protrudes into the guide groove 342. The distal end of the guide screw 41 is movable in the guide groove 342 in the Z-axis direction but the movement of the distal end of the guide screw 41 is restricted in the guide groove 342 in the circumferential direction of the connection pipe 40A. Specifically, the connection pipe 40A is movable relative to the introduction pipe 34A within the range of the length of the guide groove 342 in the Z-axis direction but the connection pipe 40A and the introduction pipe 34A moves generally integrally.

A proximal end of the guide pipe 31A is fit into the connection pipe 40A. The guide pipe 31A is fixed to the connection pipe 40A by tightening with a locking screw 42. The locking screw 42 is screwed from a circumferential surface of the connection pipe 40A to contact a circumferential surface of the guide pipe 31A. A guide hole 311A in the guide pipe 31A extends in the Z-axis direction. The center axis line La1 of the guide hole 311A conforms to the center axis line La2 of the introduction hole 341 in the introduction pipe 34A. That is, the linear guide pipe 31A and the introduction pipe 34A are coaxially connected via the connection pipe 40A. The fiber bundle Fa guided via the guide roller 33A is led into the introduction hole 341 in the introduction pipe 34A and the guide hole 311A in the guide pipe 31A.

A distal end face 343 of the introduction pipe 34A and a proximal end face 313 of the guide pipe 31A are spaced in the middle of the connection pipe 40A. An annular slit 401 extend in the outer circumferential surface of the connection pipe 40A to go round thereof in the middle of the connection pipe 40A.

As illustrated in FIG. 4(a), an air cylinder 43 is attached to a front wall 282 of the support frame 28. The air cylinder 43 is connected to a non-illustrated supply source of pressure air via an electromagnetic three-way valve 44. A drive shaft 431, which is an output shaft for the air cylinder 43, faces downward. A latch plate 45 is fixed to the drive shaft 431. As illustrated in FIG. 4(c), a bifurcated hook 451 is formed in the latch plate 45 and the hook 451 is inserted into an annular slit 401.

When the electromagnetic three-way valve 44 is in a de-magnetized state, the drive shaft 431 is in a first position as indicated by solid line in FIG. 4(a). When the electromagnetic three-way valve 44 is magnetized, pressure air is supplied from the non-illustrated supply source to the air cylinder 43 via the electromagnetic three-way valve 44 to cause the drive shaft 431 to extend in a second position as indicated by chain line in FIG. 4(a). When the drive shaft 431 changes to the second position, the hook 451 moves downward whereby the connection pipe 40A and the guide pipe 31A are moved downward. When the electromagnetic three-way valve 44 is de-magnetized, pressurized air in the air cylinder 43 is expelled so that the drive shaft 431 is returned to the first position as illustrated by the solid line in FIG. 4(a). Then, the hook 451 moves upward whereby the connection pipe 40A and the guide pipe 31A are moved upward. The magnetization of the electromagnetic three-way valve 44 is controlled by the control computer C.

The air cylinder 43 is a linear actuator including a drive shaft 431 that is linearly switched between the first position and the second position. The guide pipe 31A is connected to the drive shaft 431 via the latch plate 45

As illustrated in FIGS. 3(a) and (b), a connection pipe 40B is fit over the lower end of the introduction pipe 34B that protrudes below the lower wall 281. The connection pipe 40B is fixed to the introduction pipe 34B by tightening with a locking screw 46. The locking screw 46 is screwed from a circumferential surface of the connection pipe 40B to contact a circumferential surface of the introduction pipe 34B. That is, the connection pipe 40B is fixedly connected to the introduction pipe 34B.

A proximal end of the guide pipe 31B is fit into the connection pipe 40B. The guide pipe 31B is fixed to the connection pipe 40B by tightening with a locking screw 47. The locking screw 47 is screwed from a circumferential surface of the connection pipe 40B to contact a circumferential surface of the guide pipe 31B. A guide hole 311B in the guide pipe 31B extends in the Z-axis direction. The center axis line Lb1 of the guide hole 311B conforms to the center axis line Lb2 of the introduction hole 341 in the introduction pipe 34B. That is, the linear guide pipe 31B and the introduction pipe 34B are coaxially connected via the connection pipe 40B. The fiber bundle Fb guided via the guide roller 33B is led into the introduction hole 341 in the introduction pipe 34B and the guide hole 311B in the guide pipe 31B.

Figure 5A:
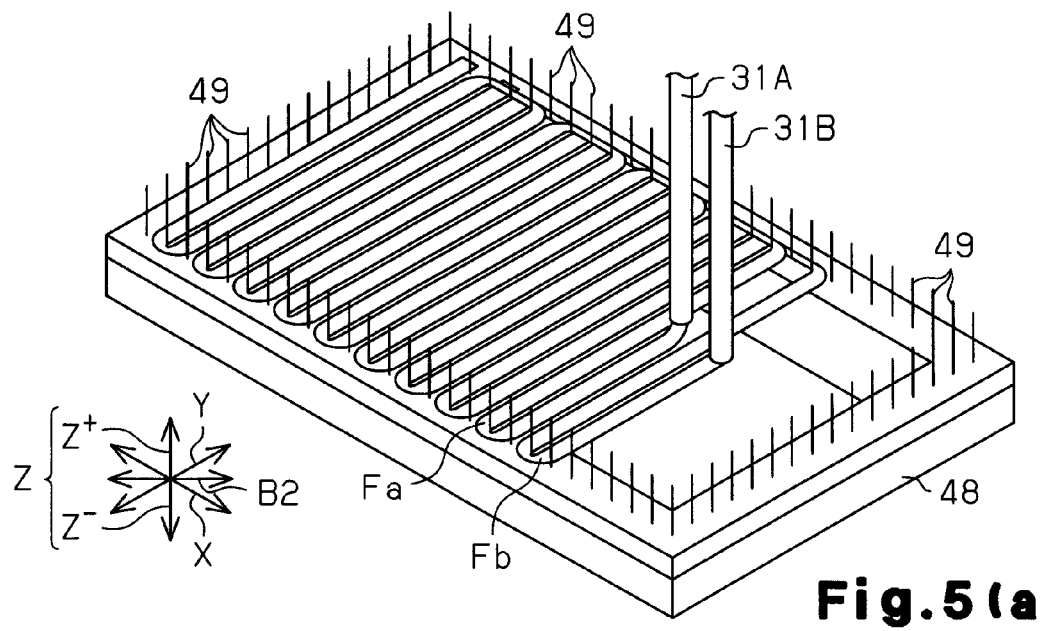
FIGS. 5(a) and (b) are perspective views illustrating arrangement of fiber bundles Fa and Fb.
Figure 5B:
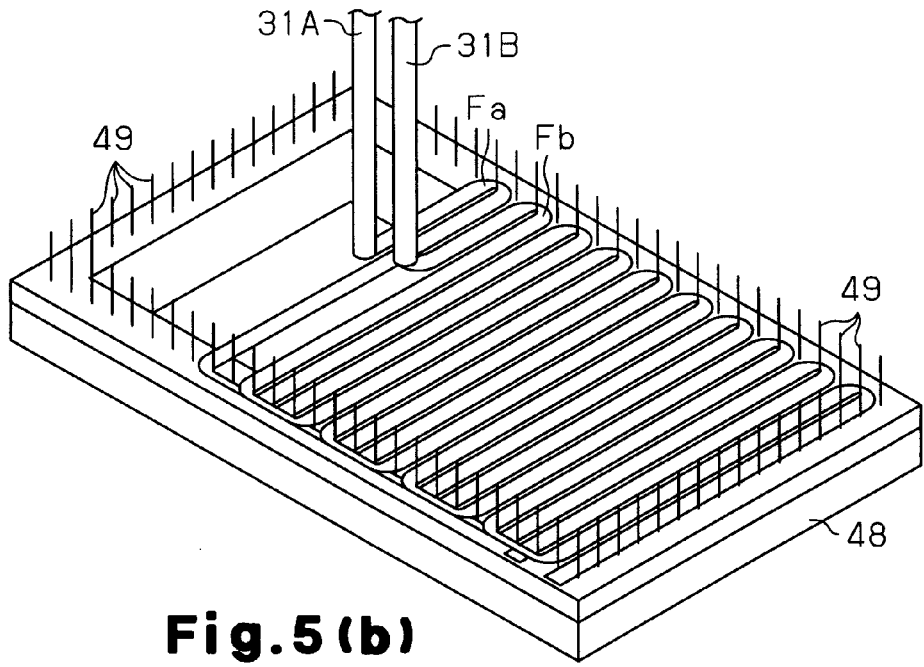
FIG. 5(c) is a partial enlarged perspective view of guide pipes.
Figure 5C:
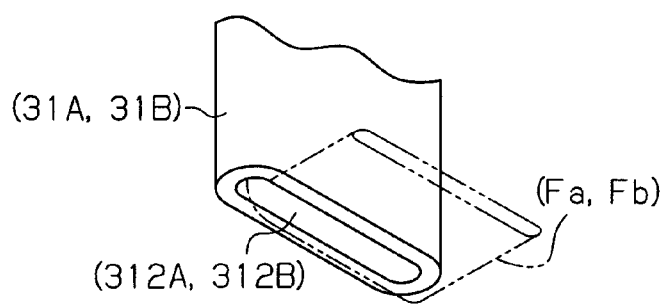

As illustrated in FIGS. 1(a) and 2, a frame 48 is positioned on the base 11. The frame 48 is square and pins 49 are arranged on the upper surface of the frame 48 at a predetermined pitch, e.g., pitch of several millimeters. The guide pipes 31A and 31B are positioned at an appropriate height by the drive force from the motor 27 and moved in the X-axis direction, in the Y-axis direction, or the bias direction B1 or B2 by the combination of the driving of the linear sliders 12 and 13 and the driving of the linear slider 14. Each of the bias directions B1 and B2 forms an angle of 45 degree with respect to the X-axis direction and the Y-axis direction. The guide pipes 31A and 31B are moved in the X-axis direction, in the Y-axis direction, or in the bias direction B1 or B2 and the fiber bundle Fa, Fb running in the guide pipes 31A and 31B are drawn out of the guide pipes 31A, 31B while being wound around the pins 49. FIGS. 5(a) and (b) illustrate examples where the fiber bundles Fa and Fb are arranged while being wound around the pins 49.

The linear sliders 12, 13 and 14 constitute a transfer device that translates the guide pipes 31A and 31B in the X-axis direction, in the Y-axis direction, or the bias direction B1 or B2.

When the guide pipes 31A and 31B are moved in the X-axis direction, the guide pipes 31A and 31B are positioned in the first juxtaposed state as indicated by the solid line in FIG. 4(d) by specifying the rotational position of the spindle 17 rotated by the motor 50. When the guide pipes 31A and 31B are moved in the Y-axis direction, the guide pipes 31A and 31B are positioned in the second juxtaposed state as indicated by the chain line in FIG. 4(d) by specifying the rotational position of the spindle 17 rotated by the motor 50. When the guide pipes 31A and 31B are moved in the bias direction B1 or B2, the guide pipes 31A and 31B may be positioned either in the first juxtaposed state or in the second juxtaposed state. The rotation of the guide pipes 31A and 31B around the spindle 17 is restricted in the range indicated by the arrows Q1 and Q2 to avoid the contact of the fiber bundles Fa and Fb positioned between the guide rollers 26A, 26B and the guide rollers 32A, 32B with the linear slider 14.

The orientation of the guide pipes 31A and 31B is adjusted by the drive force from the motor 37 so that the flat faces of the fiber bundles Fa and Fb reeled out of the guide pipes 31A and 31B are directed to the linear movement direction of the guide pipes 31A and 31B except when the guide pipes 31A and 31B are turned to wind the fiber bundles Fa and Fb around the pins 49. In the states illustrated in FIGS. 5(a) and (b), the flat faces of the fiber bundle Fa, Fb reeled out of the guide pipes 31A and 31B are directed toward the Y-axis direction. Hereinafter, the orientation of the guide pipes 31A and 31B when the flat faces of the fiber bundles Fa and Fb are directed toward the Y-axis direction is referred to as the "orientation of the Y-axis direction". The orientation of the guide pipes 31A and 31B when the flat faces of the fiber bundles Fa and Fb are directed toward the X-axis direction is referred to as the "orientation of the X-axis direction". The orientation of the guide pipes 31A and 31B when the flat faces of the fiber bundles Fa and Fb are directed toward the bias direction B1 is referred to as the "orientation of the bias direction B1". The orientation of the guide pipes 31A and 31B when the flat faces of the fiber bundles Fa and Fb are directed toward the bias direction B2 is referred to as the "orientation of bias direction B2".

FIGS. 18(a) to (h) illustrate examples of arrangement patterns of a fiber bundle F in each of fiber bundle layers Gx, Gy, Gb1 and Gb2 formed of the fiber bundles F. Regarding the fiber bundles F, only one of the fiber bundles Fa and Fb is schematically illustrated.

When the electromagnetic three-way valve 44 is de-magnetized, the outlet 312A of the guide hole 311A in the guide pipe 31A is located higher than the outlet 312B of the guide hole 311B in the guide pipe 31B. That is, the outlet 312A of the guide hole 311A in the guide pipe 31A and the outlet 312B of the guide hole 311B in the guide pipe 31B are positioned in this order in the first lamination direction of the fiber bundle layer direction from the guide pipes 31A and 31B to the fiber bundle layer (from top to bottom), i.e., the direction indicated by arrow $Z^-$ in FIG. 1(a). When the electromagnetic three-way valve 44 is magnetized, the outlet 312A of the guide hole 311A is located lower than the outlet 312B of the guide hole 311B. That is, the outlet 312A of the guide hole 311A in the guide pipe 31A and the outlet 312B of the guide hole 311B in the guide pipe 31B are positioned in this order in the second lamination direction of the fiber bundle layer direction from bottom to top, i.e., the direction indicated by arrow $Z^+$ in FIG. 1(a) opposite to the first direction $Z^-$.

The air cylinder 43 and the electromagnetic three-way valve 44 constitute a position-changing device which switches the outlet 312A of the guide pipes 31A and the outlet 312B of the guide pipes 31B between a first order-defining state and a second order-defining state. The first order-defining state defines the first order in which the outlet 312A of the guide pipes 31A and the outlet 312B of the guide pipes 31B are positioned in descending order (from top to down). The second order-defining state defines the second order in which the outlet 312A of the guide pipes 31A and the outlet 312B of the guide pipes 31B are positioned in ascending order (from down to top). The demagnetization of the valve 44 causes the guide pipes 31A and 31B to be positioned in a manner such that the outlet 312A of the guide hole 311A in guide pipe 31A located at the first end (the right end in FIG. 1(c)) and the outlet 312B of the guide hole 311B in the guide pipe 31B located at the second end (the left end in FIG. 1(c) on the opposite side of the first end are positioned in the first order in which the outlet 312A and the outlet 312B are positioned in this order in the first direction $Z^-$ of lamination. The magnetization of the valve 44 causes the guide pipes 31A and 31B to be positioned in a manner such that the outlet 312A located at the right end in FIG. 1(c) and the outlet 312B located at the left end in FIG. 1 are positioned in the second order in which the outlet 312A and the outlet 312B are positioned in this order in the second direction $Z^+$ of lamination.

FIGS. 6 to 17 illustrate combinations of a juxtaposed state, an order, and an orientation of the guide pipes 31A and 31B. FIGS. 6(a) to 17(a) are side views from the same direction as in FIG. 1(a). FIGS. 6(b) to 17(b) are front views from the same direction as in FIG. 1(c). FIGS. 6(c) to 17(c) are cross-sectional plan views.

Figures 6A, 6B, 6C:
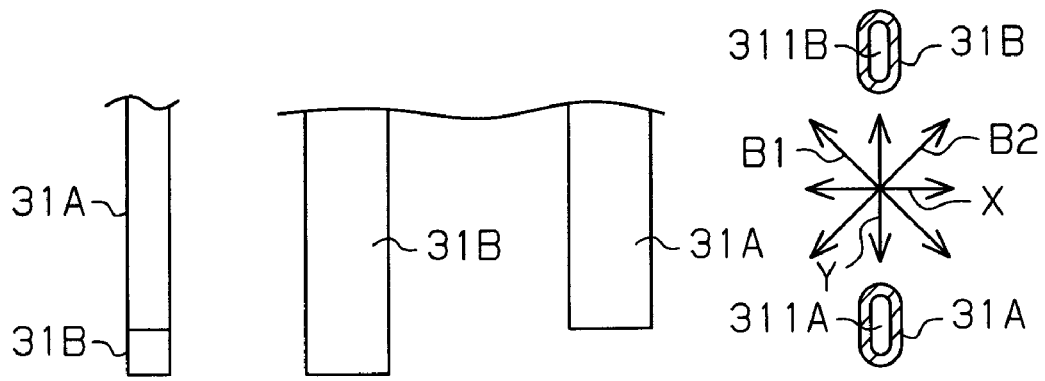
FIG. 6(a) is a side view illustrating a juxtaposed state of the guide pipes.
FIG. 6(b) is a rear view illustrating an order of the guide pipes.
FIG. 6(c) is a cross-sectional plan view illustrating the orientation of the guide pipes.
Figures 7A, 7B, 7C:
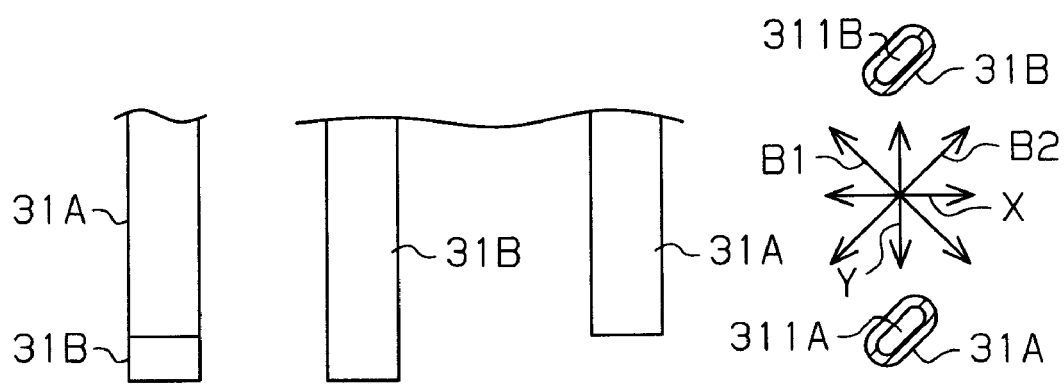
FIG. 7(a) is a side view illustrating a juxtaposed state of the guide pipes.
FIG. 7(b) is a rear view illustrating an order of the guide pipes.
FIG. 7(c) is a cross-sectional plan view illustrating the orientation of the guide pipes.
Figures 8A, 8B, 8C:
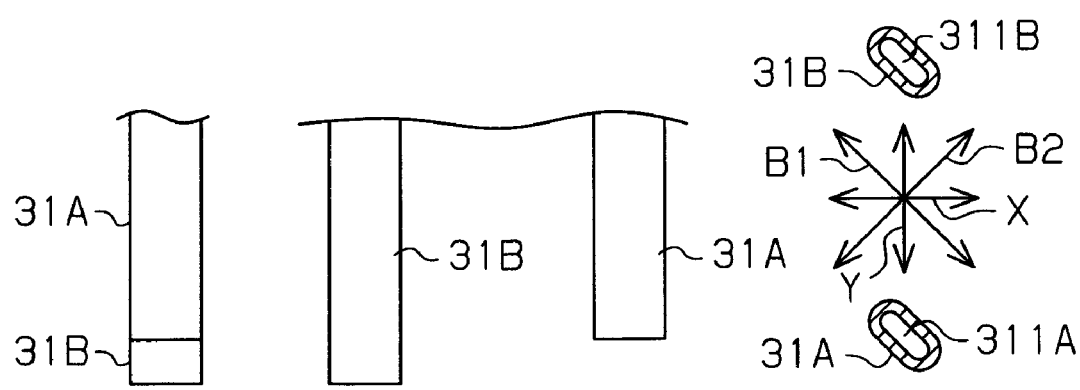
FIG. 8(a) is a side view illustrating a juxtaposed state of the guide pipes.
FIG. 8(b) is a rear view illustrating an order of the guide pipes.
FIG. 8(c) is a cross-sectional plan view illustrating the orientation of the guide pipes.
Figures 9A, 9B, 9C:
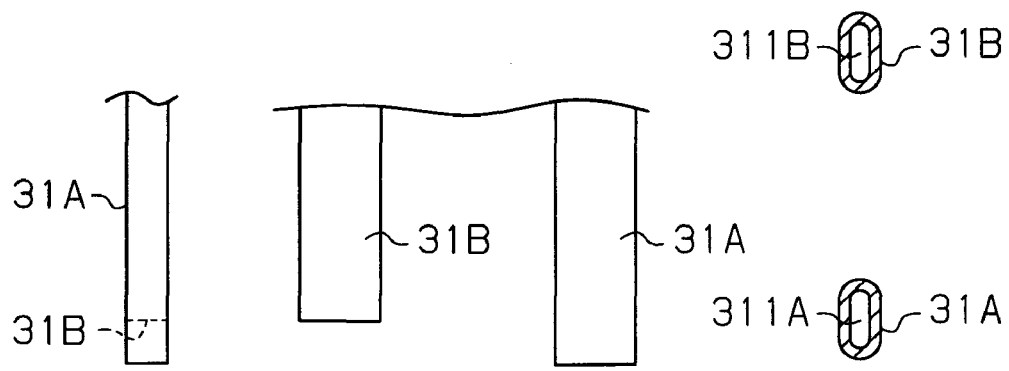
FIG. 9(a) is a side view illustrating a juxtaposed state of the guide pipes.
FIG. 9(b) is a rear view illustrating an order of the guide pipes.
FIG. 9(c) is a cross-sectional plan view illustrating the orientation of the guide pipes.
Figures 10A, 10B, 10C:
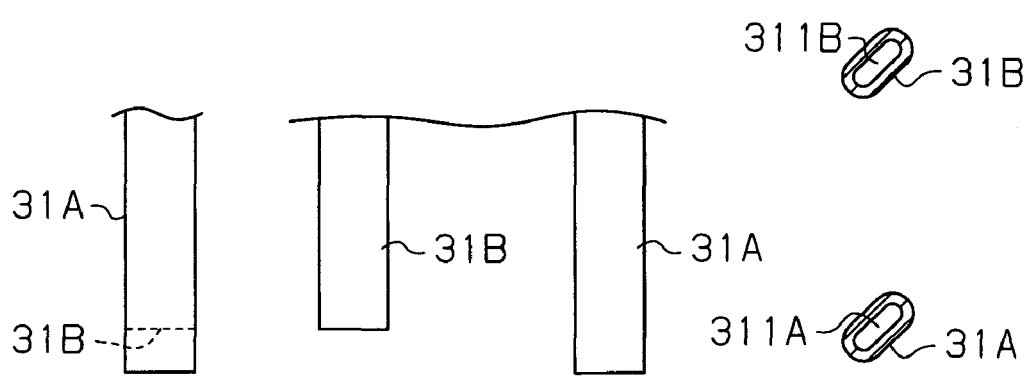
FIG. 10(a) is a side view illustrating a juxtaposed state of the guide pipes.
FIG. 10(b) is a rear view illustrating an order of the guide pipes.
FIG. 10(c) is a cross-sectional plan view illustrating the orientation of the guide pipes.
Figures 11A, 11B, 11C:
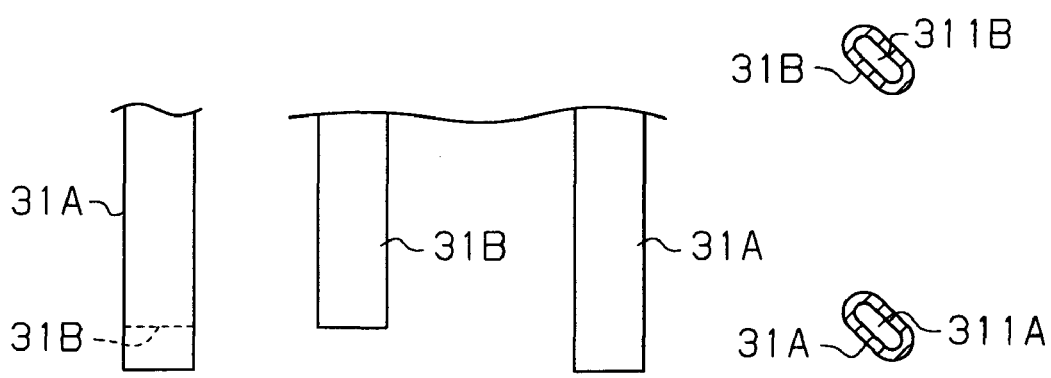
FIG. 11(a) is a side view illustrating a juxtaposed state of the guide pipes.
FIG. 11(b) is a rear view illustrating an order of the guide pipes.
FIG. 11(c) is a cross-sectional plan view illustrating the orientation of the guide pipes.

In FIGS. 6(a), (b) and (c), the guide pipes 31A and 31B are in the first juxtaposed state, in the first order and in the X-axis direction. In FIG. 7(a), (b) and (c), the guide pipes 31A and 31B are in the first juxtaposed state, in the first order and in the bias direction B1. In FIG. 8(a), (b) and (c), the guide pipes 31A and 31B are in the first juxtaposed state, in the first order and in the bias direction B2. In FIG. 9(a), (b) and (c), the guide pipes 31A and 31B are in the first juxtaposed state, in the second order and in the X-axis direction. In FIG. 10(a), (b) and (c), the guide pipes 31A and 31B are in the first juxtaposed state, in the second order and in the bias direction B1. In FIG. 11(a), (b) and (c), the guide pipes 31A and 31B are in the first juxtaposed state, in the second order and in the bias direction B2.

Figures 12A, 12B, 12C:
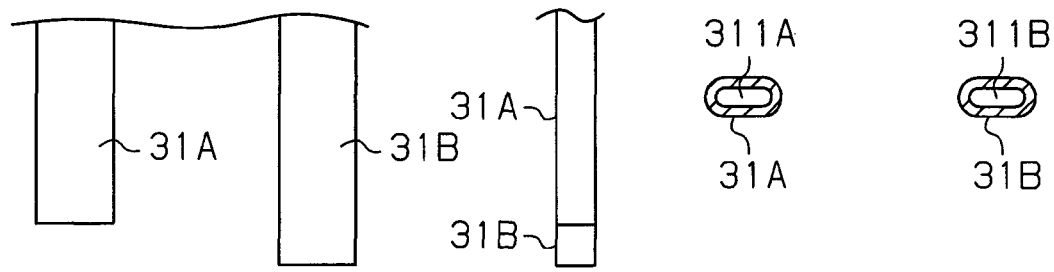
FIG. 12(a) is a side view illustrating a juxtaposed state of the guide pipes.
FIG. 12(b) is a rear view illustrating an order of the guide pipes.
FIG. 12(c) is a cross-sectional plan view illustrating the orientation of the guide pipes.
Figures 13A, 13B, 13C:
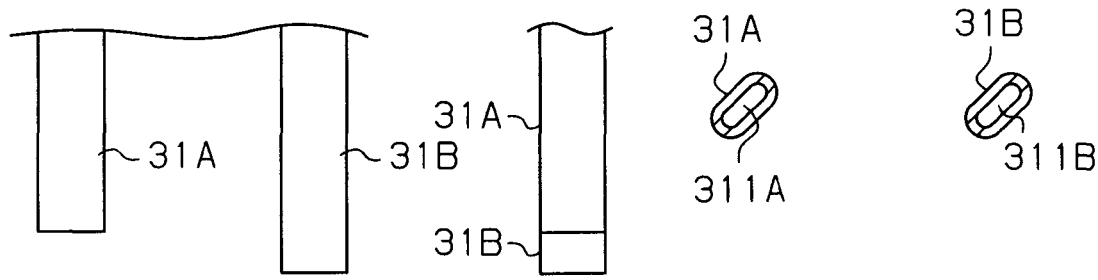
FIG. 13(a) is a side view illustrating a juxtaposed state of the guide pipes.
FIG. 13(b) is a rear view illustrating an order of the guide pipes.
FIG. 13(c) is a cross-sectional plan view illustrating the orientation of the guide pipes.
Figures 14A, 14B, 14C:
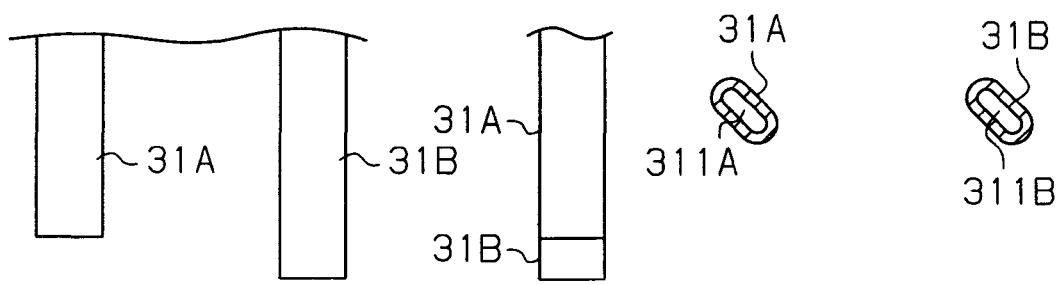
FIG. 14(a) is a side view illustrating a juxtaposed state of the guide pipes.
FIG. 14(b) is a rear view illustrating an order of the guide pipes.
FIG. 14(c) is a cross-sectional plan view illustrating the orientation of the guide pipes.

In FIG. 12(a), (b) and (c), the guide pipes 31A and 31B are in the second juxtaposed state, in the first order and in the Y-axis direction. In FIG. 13(a), (b) and (c), the guide pipes 31A and 31B are in the second juxtaposed state, in the first order and in the bias direction B1. In FIG. 14(a), (b) and (c), the guide pipes 31A and 31B are in the second juxtaposed state, in the first order and in the bias direction B2. In FIG. 15(a), (b) and (c), the guide pipes 31A and 31B are in the second juxtaposed state, in the second order and in the Y-axis direction. In FIG. 16(a), (b) and (c), the guide pipes 31A and 31B are in the second juxtaposed state, in the second order and in the bias direction B1. In FIG. 17(a), (b) and (c), the guide pipes 31A and 31B are in the second juxtaposed state, in the second order and in the bias direction B2.

Given that the fiber bundle layer Gx illustrated in FIG. 18(a) is formed: When the guide pipes 31A and 31B are moved from the point S1 as a starting point, the guide pipes 31A and 31B are set in the first juxtaposed state, in the first order and in the X-axis direction, as illustrated in FIGS. 6(a), (b) and (c). When the guide pipes 31A and 31B are moved from the point S9 as a starting point, the guide pipes 31A and 31B are set in the first juxtaposed state, in the second order and in the X-axis direction, as illustrated in FIGS. 9(a), (b) and (c).

Given that the fiber bundle layer Gx illustrated in FIG. 18(b) is formed: When the guide pipes 31A and 31B are moved from the point S2 as a starting point, the guide pipes 31A and 31B are set in the first juxtaposed state, in the first order and in the X-axis direction, as illustrated in FIGS. 6(a), (b) and (c). When the guide pipes 31A and 31B are moved from the point S10 as a starting point, the guide pipes 31A and 31B are set in the first juxtaposed state, in the second order and in the X-axis direction, as illustrated in FIGS. 9(a), (b) and (c).

Given that the fiber bundle layer Gy illustrated in FIG. 18(c) is formed: When the guide pipes 31A and 31B are moved from the point S3 as a starting point, the guide pipes 31A and 31B are set in the second juxtaposed state, in the second order and in the Y-axis direction, as illustrated in FIGS. 15(a), (b) and (c). When the guide pipes 31A and 31B are moved from the point S11 as a starting point, the guide pipes 31A and 31B are set in the second juxtaposed state, in the first order and in the Y-axis direction, in FIGS. 12(a), (b) and (c).

Given that the fiber bundle layer Gy illustrated in FIG. 18(d) is formed: When the guide pipes 31A and 31B are moved from the point S4 as a starting point, the guide pipes 31A and 31B are set in the second juxtaposed state, in the second order and in the Y-axis direction, as illustrated in FIGS. 15(a), (b) and (c). When the guide pipes 31A and 31B are moved from the point S12 as a starting point, the guide pipes 31A and 31B are set in the second juxtaposed state, in the first order and in the Y-axis direction, as illustrated in FIGS. 12(a), (b) and (c).

Given that the fiber bundle layer Gb1 illustrated in FIG. 18(e) is formed: When the guide pipes 31A and 31B are moved from the point S5 as a starting point, the guide pipes 31A and 31B are set in the first juxtaposed state, in the first order and in the bias direction B2 as illustrated in FIGS. 8(a), (b) and (c) or set in the second juxtaposed state, in the second order and in the bias direction B2 as illustrated in FIGS. 17(a), (b) and (c). When the guide pipes 31A and 31B are moved from the point S13 as a starting point, the guide pipes 31A and 31B are set in the first juxtaposed state, in the second order and in the bias direction B2 as illustrated in FIGS. 11(a), (b) and (c) or set in the second juxtaposed state, in the first order and in the bias direction B2, as illustrated in FIGS. 14(a), (b) and (c).

Given that the fiber bundle layer Gb1 illustrated in FIG. 18(f) is formed: When the guide pipes 31A and 31B are moved from the point S6 as a starting point, the guide pipes 31A and 31B are set in the first juxtaposed state, in the first order and in the bias direction B2 as illustrated in FIGS. 8(a), (b) and (c) or set in the second juxtaposed state, in the second order and in the bias direction B2 as illustrated in FIGS. 17(a), (b) and (c). When the guide pipes 31A and 31B are moved from the point S14 as a starting point, the guide pipes 31A and 31B are set in the first juxtaposed state, in the second order and in the bias direction B2 as illustrated in FIGS. 11(a), (b) and (c) or set in the second juxtaposed state, in the first order and in the bias direction B2, FIGS. 14(a), (b) and (c).

Given that the fiber bundle layer Gb2 illustrated in FIG. 18(g) is formed: When the guide pipes 31A and 31B are moved from the point S7 as a starting point, the guide pipes 31A and 31B are set in the second juxtaposed state, in the first order and in the bias direction B1 as illustrated in FIGS. 13(a), (b) and (c) or set in the first juxtaposed state, in the first order and in the bias direction B1, as illustrated in FIGS. 7(a), (b) and (c). When the guide pipes 31A and 31B are moved from the point S15 as a starting point, the guide pipes 31A and 31B are set in the second juxtaposed state, in the second order and in the bias direction B1, as illustrated in FIGS. 16(a), (b) and (c) or set in the first juxtaposed state, in the second order and in the bias direction B1, as illustrated in FIGS. 10(a), (b) and (c).

Given that the fiber bundle layer Gb2 illustrated in FIG. 18(h) is formed: When the guide pipes 31A and 31B are moved from the point S8 as a starting point, the guide pipes 31A and 31B are set in the second juxtaposed state, in the first order and in the bias direction B1, as illustrated in FIGS. 13(a), (b) and (c) or set in the first juxtaposed state, in the first order and in the bias direction B1, as illustrated in FIGS. 7(a), (b) and (c). When the guide pipes 31A and 31B are moved from the point S16 as a starting point, the guide pipes 31A and 31B are set in the second juxtaposed state, in the second order and in the bias direction B1, as illustrated in FIGS. 16(a), (b) and (c) or set in the first juxtaposed state, in the second order and in the bias direction B1 as illustrated in FIGS. 10(a), (b) and (c).

When a migration pathway of one of the two guide pipes 31A and 31B traverses a fiber bundle drawn out of the other guide pipe as viewed from the Z-axis direction (or the direction in which the fiber bundles are laminated), the position-changing device is held in the first order-defining state, which is the position where the fiber bundle drawn out of the one guide pipe passes on the proximal side of the other guide pipe from which the fiber bundle is derived. That is, the order-defining state of the position-changing device in each layer is determined so that the position of the front guide pipe is lower than the position of the rear guide pipe (or closer to the frame 48) in the direction the head advances or the head moves to the next line after the head turns at the pin 49.

When the orientation of the guide pipes 31A and 31B are in the bias direction B1 or B2, the juxtaposed state of the guide pipes 31A and 31B and the orientation of the guide pipes 31A and 31B, which is rotated by the motor 37, may be controlled in accordance with the movement direction of the guide pipes 31A and 31B when the guide pipes 31A and 31B pass between the pins 49.

The first embodiment has the following advantages.

(1) In the formation of the fiber bundle layer of FIGS. 18(a) to (h), the outlet 312B of the guide pipe 31B is located higher than the outlet 312A of the guide pipe 31A when a migration pathway of the guide pipe 31B traverses the fiber bundle Fa drawn out of the guide pipes 31A, viewed from the Z-axis direction (or the direction in which the fiber bundles are laminated). Meanwhile, the outlet 312A of the guide pipe 31A is located higher than the outlet 312B of the guide pipe 31B when a migration pathway of the guide pipe 31A traverses the fiber bundle Fb drawn from the guide pipe 31B, viewed from the Z-axis direction (or the direction in which the fiber bundles are laminated). Accordingly, if either of the S1 to S16 is selected as a starting point of the guide pipes 31A and 31B, the guide pipe 31A is not caught by the fiber bundle Fb and the guide pipe 31B is not caught by the fiber bundle Fa.

If the order of the guide pipes 31A and 31B is limited to the first order in the formation of the fiber bundle layer of FIGS. 18(a) to (h), the guide pipe 31B is caught by the fiber bundle Fa in the case where the starting point of the guide pipes 31A and 31B is S9, S10, S3 or S4. If the order of the guide pipes 31A and 31B is limited to the second order in the formation of the fiber bundle layer of FIGS. 18(a) to (h), the guide pipe 31A is caught by the fiber bundle Fb in the case where the starting point of the guide pipes 31A and 31B is S1, S2, S11 or S12.

In the first embodiment, however, the guide pipes 31A and 31B are switched between the first order and second order so that catching of the guide pipe 31A by the fiber bundle Fb and catching of the guide pipe 31B by the fiber bundle Fa are prevented.

(2) In the first embodiment, there are only two guide pipes 31A and 31B and the position of only one guide pipe 31A is changeable along the direction Z⁻ by the operation of the air cylinder 43. When the guide pipes are two and the position of only one guide pipe is changeable along the direction Z⁻, the position-changing device may be formed of a single linear actuator (i.e., the air cylinder 43) and the electromagnetic three-way valve 44. That is, the configuration in which the guide pipes are two and the position of only one guide pipe is changeable along the direction Z⁻ is advantageous to simplify the position-changing device.

(3) The air cylinder 43 is a simple linear actuator suitable for the position-changing device.

(4) In view of the physical properties of three-dimensional fabric structure, it is desirable that the fiber bundles Fa and Fb be arranged in a flat state. To meet this, the flat faces of the fiber bundles Fa and Fb are required to face in the movement direction of the guide pipes 31A and 31B. In the configuration in which the introduction pipes 34A and 34B are rotated, the flat faces of the fiber bundles Fa and Fb may be directed toward the movement direction of the guide pipes 31A and 31B. Moreover, the position of the guide pipe 31A, which is connected to the introduction pipe 34A via the connection pipe 40A, may be changed along the direction Z⁻ of the guide pipe 31A. Accordingly, catching of other guide pipe 31A by the fiber bundle drawn out of the guide pipe is prevented.

Next, arrangement heads according to a second embodiment in FIGS. 19(a) and (b) are described. In the second embodiment, the same elements as in the first embodiment are given the same reference numerals.

A connection pipe 40B is fit over the lower end of the introduction pipe 34B that protrudes below the lower wall 281. A guide groove 344 extends on the lateral side of the introduction pipe 34B in the Z-axis direction. A guide screw 53 is screwed through the circumferential wall of the connection pipe 40B. A distal end of the guide screw 53 intrudes into the guide groove 344. The distal end of the guide screw 53 is movable in the guide groove 344 in the Z-axis direction but the movement of the distal end of the guide screw 53 is restricted in the guide groove 344 in the circumferential direction of the connection pipe 40B. Specifically, the connection pipe 40B is movable relative to the introduction pipe 34B within the range of the length of the guide groove 344 in the Z-axis direction.

Racks 54 and 55 are formed on the outer circumferential surfaces of the connection pipes 40A and 40B, respectively, to extend in the Z-axis direction. The racks 54 and 55 face each other and mate with a pinion 56. Teeth 541 and 551 of the racks 54 and 55 are arcuate protrusions extending in the circumferential direction of and on the outer circumferential surfaces of the connection pipes 40A and 40B. Therefore, even when the racks 54 and 55 and the pinion 56 mate, the connection pipes 40A and 40B and the guide pipes 31A and 31B are rotatable around the central axis lines Lb1 and Lb2.

The pinion 56 is fixed to an output shaft 571 of the motor 57. The forward rotation of the motor 57 causes the connection pipe 40A to move downward as well as the connection pipe 40B to move upward. The reverse rotation of the motor 57 causes the connection pipe 40A to move upward as well as the connection pipe 40B to move downward.

FIG. 19(a) illustrates the first order in which the outlet 312A of the guide pipe 31A is located higher than the outlet 312B of the guide pipe 31B. FIG. 19(b) illustrates the second order in which the outlet 312A of the guide pipe 31A is located lower than the outlet 312B of the guide pipe 31B.

The motor 57, the pinion 56 and the racks 54, 55 constitute a position-changing device which is switched between the first order-defining state, which defines the guide pipes 31A and 31B in the first order, and the second order-defining state, which defines the guide pipes 31A and 31B in the second order. The position-changing device may change the positions of the guide pipes 31A and 31B along the direction Z⁻ together or in the opposite direction to each other.

The present invention may be modified to form the following alternate embodiments.

In the first embodiment, a linear solenoid may be used instead of the air cylinder 43.

In the second embodiment, a rotary solenoid may be used instead of the motor 57.

The present invention is applicable to an apparatus for arranging fiber bundles having three or more guide pipes. In this case, three or more guide pipes are arranged in a plane parallel to the Y- and Z-axis directions in the state of FIG. 1(a).

The present invention is applicable to an apparatus for arranging fiber bundles in which the introduction pipes 34A and 34B do not rotate. In this case, the orientation of the bias direction B1 or B2 does not change while the guide pipes 31A and 31B are moving. If the juxtaposed state is controlled in a middle state between the first juxtaposed state and the second juxtaposed state, it is possible to match the bias direction B1 with the direction the flat faces of the fiber bundles Fa and Fb. If the juxtaposed state is controlled so that the fiber bundles Fa and Fb and the linear slider 14 do not contact, it is possible to match the bias direction B2 with the direction of the flat faces of the fiber bundles Fa and Fb.

The invention claimed is:

1. An apparatus for arranging fiber bundles, the apparatus comprising:
 a plurality of juxtaposed guide pipes and a transfer device for transferring the guide pipes, each of the guide pipes having a guide hole through which a fiber bundle is passed, wherein the transfer device transfers the guide pipes so that the fiber bundles are extracted from outlets of the guide holes of the guide pipes and arranged to form a layer of the fiber bundles, wherein the fiber bundles running in the guide pipes are drawn out of the guide pipes while being wound around a plurality of pins;
 a position-changing device to which the plurality of guide pipes except for one pipe or all the plurality of guide pipes are connected, wherein the position-changing device is capable of changing the position of the guide pipe connected to the position-changing device in the direction in which the fiber bundle layer is laminated,
 wherein the position-changing device switches outlets of the guide holes of the guide pipes between a first order-defining state and a second order-defining state, wherein, in the first order-defining state, outlets of the guide holes of the guide pipes are positioned in a first lamination direction in the order from the guide pipe located at a first end to the guide pipe located at a second end, wherein, in the second order-defining state, outlets of the guide holes of the guide pipes are positioned in a second lamination direction in the order from the guide pipe located at a first end to the guide pipe located at a second end, wherein the second direction is opposite from the first direction.

2. The apparatus of claim 1 wherein the guide pipes are two guide pipes composed of a first guide pipe and a second guide pipe, wherein the position-changing device is capable of changing the position of only the first guide pipe in the lamination direction.

3. The apparatus of claim 1 wherein the position-changing device comprises a linear actuator including an output section positioned to change linearly between a first position and a second position, wherein the guide pipes the position of which can be changed in the lamination direction are connected to the output section.

4. The apparatus of claim 1 wherein the guide pipes are two guide pipes, wherein the position-changing device is capable of changing the position of the two guide pipes in the lamination direction, wherein the position-changing device is capable of changing the position of the two guide pipes in the lamination direction simultaneously and in the opposite direction.

5. An apparatus for arranging fiber bundles, the apparatus comprising:
a plurality of juxtaposed guide pipes and a transfer device for transferring the guide pipes, each of the guide pipes having a guide hole through which a fiber bundle is passed, wherein the transfer device transfers the guide pipes so that the fiber bundles are extracted from outlets of the guide holes of the guide pipes and arranged to form a layer of the fiber bundles;
a position-changing device to which the plurality of guide pipes except for one pipe or all the plurality of guide pipes are connected, wherein the position-changing device is capable of changing the position of the guide pipe connected to the position-changing device in the direction in which the fiber bundle layer is laminated,
wherein the position-changing device switches outlets of the guide holes of the guide pipes between a first order-defining state and a second order-defining state, wherein, in the first order-defining state, outlets of the guide holes of the guide pipes are positioned in a first lamination direction in the order from the guide pipe located at a first end to the guide pipe located at a second end, wherein, in the second order-defining state, outlets of the guide holes of the guide pipes are positioned in a second lamination direction in the order from the guide pipe located at a first end to the guide pipe located at a second end, wherein the second direction is opposite from the first direction,
wherein the guide pipes are two guide pipes composed of a first guide pipe and a second guide pipe, wherein the position-changing device is capable of changing the position of only the first guide pipe in the lamination direction, wherein, when a migration pathway of the first guide pipe traverses the fiber bundle drawn out of the second guide pipe viewed from the lamination direction, the position-changing device is held in a first order-defining state, wherein the first order-defining state is the position where the fiber bundle drawn out of the first guide pipe passes on the proximal side of the second guide pipe from which the fiber bundle is derived.

6. The apparatus of claim 5, wherein the fiber bundles running in the guide pipes are drawn out of the guide pipes while being wound around a plurality of pins.

7. An apparatus for arranging fiber bundles, the apparatus comprising:
a plurality of juxtaposed guide pipes and a transfer device for transferring the guide pipes, each of the guide pipes having a guide hole through which a fiber bundle is passed, wherein the transfer device transfers the guide pipes so that the fiber bundles are extracted from outlets of the guide holes of the guide pipes and arranged to form a layer of the fiber bundles;
a position-changing device to which the plurality of guide pipes except for one pipe or all the plurality of guide pipes are connected, wherein the position-changing device is capable of changing the position of the guide pipe connected to the position-changing device in the direction in which the fiber bundle layer is laminated,
wherein the position-changing device switches outlets of the guide holes of the guide pipes between a first order-defining state and a second order-defining state, wherein, in the first order-defining state, outlets of the guide holes of the guide pipes are positioned in a first lamination direction in the order from the guide pipe located at a first end to the guide pipe located at a second end, wherein, in the second order-defining state, outlets of the guide holes of the guide pipes are positioned in a second lamination direction in the order from the guide pipe located at a first end to the guide pipe located at a second end, wherein the second direction is opposite from the first direction,
wherein the guide holes of the plurality of guide pipes have flat cross-sectional shape, wherein the apparatus for arranging fiber bundles further comprises:
a rotary drive mechanism;
an introduction pipe rotatably connected to the rotary drive mechanism to rotate around an axis line of the introduction pipe; and
a connection pipe for connecting the guide pipes the position of which can be changed in the lamination direction and the introduction pipe to align coaxially, wherein the connection pipe is fixed to the guide pipe the position of which can be changed in the lamination direction, and wherein the connection pipe is connected to the introduction pipe so that the position of the connection pipe can be changed in the lamination direction.

8. The apparatus of claim 7, wherein the fiber bundles running in the guide pipes are drawn out of the guide pipes while being wound around a plurality of pins.

* * * * *